United States Patent
Von Koenigsegg et al.

(10) Patent No.: US 11,401,982 B2
(45) Date of Patent: Aug. 2, 2022

(54) MULTIPLE-PLATE WET CLUTCH

(71) Applicant: KOENIGSEGG AUTOMOTIVE AB, Angelholm (SE)

(72) Inventors: Christian Von Koenigsegg, Vejbystrand (SE); Dag Bolenius, Stockholm (SE)

(73) Assignee: KOENIGSEGG AUTOMOTIVE AB, Angelholm (SE)

( * ) Notice: Subject to any disclaimer, the term of this patent is extended or adjusted under 35 U.S.C. 154(b) by 0 days.

(21) Appl. No.: 17/028,225

(22) Filed: Sep. 22, 2020

(65) Prior Publication Data
US 2021/0088085 A1 Mar. 25, 2021

(30) Foreign Application Priority Data
Sep. 23, 2019 (EP) .................................... 19198935

(51) Int. Cl.
*F16D 25/0638* (2006.01)
*F16D 25/12* (2006.01)

(52) U.S. Cl.
CPC ....... *F16D 25/0638* (2013.01); *F16D 25/123* (2013.01)

(58) Field of Classification Search
CPC ... F16D 25/0638; F16D 25/123; F16D 13/648
See application file for complete search history.

(56) References Cited

U.S. PATENT DOCUMENTS

| 3,863,746 | A | * | 2/1975 | Schulz | ............... | F16D 25/0638 |
| | | | | | | 192/106 F |
| 4,446,953 | A | | 5/1984 | Voss et al. | | |
| 6,840,363 | B2 | * | 1/2005 | Braford, Jr. | ............. | F16D 13/72 |
| | | | | | | 192/70.12 |
| 2016/0097428 | A1 | | 4/2016 | Calvert | | |

(Continued)

FOREIGN PATENT DOCUMENTS

EP  1445506  8/2004

OTHER PUBLICATIONS

Definition of "juxtapose," retrieved from https://dictionary.cambridge.org/us/dictionary/english/juxtapose (Year: 2021).*

(Continued)

*Primary Examiner* — Stacey A Fluhart
(74) *Attorney, Agent, or Firm* — Klein, O'Neill & Singh, LLP

(57) ABSTRACT

A multiple-plate wet clutch for mounting on a shaft having an internal shaft conduit for a coolant has a clutch hub mounted on the shaft, a clutch basket rotationally supported relative to shaft, a clutch pack operationally connecting the clutch hub and the clutch basket, and a collar mounted on the shaft. The wet clutch further has a plurality of clutch conduits, each having a collar portion formed by the collar and a hub portion formed by the clutch hub. The collar portion has an inlet for receiving the coolant, and the hub portion has one or more outlets at the clutch pack for releasing the coolant. The wet clutch further has a plurality (Continued)

of valves, each connected to a clutch conduit to control the flow of coolant through the clutch conduit. An actuator, supported by the collar, is configured to simultaneously engage the clutch pack and operate the valves.

19 Claims, 4 Drawing Sheets

(56) References Cited

U.S. PATENT DOCUMENTS

2018/0216672 A1* 8/2018 Putzer .................... F16D 13/70
2019/0193207 A1* 6/2019 Kremer ................. B23K 26/38

OTHER PUBLICATIONS

Extended Search Reporton corresponding European application (EP 19198935.9) from International Searching Authority (EPO) dated Feb. 12, 2020.

* cited by examiner

MULTIPLE-PLATE WET CLUTCH

CROSS-REFERENCE TO RELATED APPLICATION

This application claims priority, under 35 U.S.C. 119, from EP Application No. 19198935.9, filed Sep. 23, 2019, the disclosure of which is incorporated herein in its entirety.

BACKGROUND

The proposed technology generally relates to the field of wet clutches for road vehicles, and in particular to multiple-plate wet clutches for high performance applications.

In some applications, the dimensions of a single plate clutch are too great, and there is a need for a more compact clutch for transferring the required torque. This can be obtained by multiple-plate clutches, which allow for smaller diameters with a maintained total friction force. Multiple-plate clutches are a well-established technology. In road vehicles, they are typically found in motorcycles and high-performance cars. Multiple-plate clutches have several driving members interleaved with several driven members, typically collected in a clutch pack. There is a need to further reduce the dimensions of clutches, or at least to maintain current dimensions, with improved efficiency.

The friction elements, or driving and driven members, of a dry clutch are not subjected to a cooling lubricating liquid and rely on mechanical friction only to engage. In a wet clutch, the friction elements are typically immersed in a cooling and lubricating liquid allowing for a smoother performance and longer life.

In some applications, the viscous drag in the clutch pack of wet clutches that are unengaged for a prolonged period of time may result in efficiency losses. Such wet clutches are typically designed such that they are disengaged when not activated and engaged when actively activated. Thus, there is a need for a multiple-plate wet clutch that reduces the viscous drag when the clutch is disengaged.

SUMMARY

It is an object of the proposed technology to improve the efficiency and reduce the overall dimensions of multiple-plate wet clutches. It is a further object to improve the cooling of such clutches and to reduce the viscous drag when they are unengaged.

In a first aspect of the proposed technology, a multiple-plate wet clutch is provided for mounting on a shaft having an internal shaft conduit for a coolant. The wet clutch comprises: a clutch hub configured to be mounted on the shaft, a clutch basket configured to be rotationally supported relative to the shaft, a clutch pack operationally connecting the clutch hub and the clutch basket, and a collar, or front end, configured to be mounted on the shaft, wherein the collar is juxtaposed to the clutch hub. The wet clutch further comprises: a plurality of individual clutch conduits, wherein each clutch conduit has a collar portion formed by the collar and a hub portion formed by the clutch hub. The collar portion has an inlet for receiving the coolant, and the hub portion is coupled to the collar portion and has one or more outlets at the clutch pack for releasing the coolant. The wet clutch further comprises: a plurality of valves, wherein each valve is operationally connected to a single clutch conduit configured to control the flow of coolant through the clutch conduit, and an actuator supported by the collar and configured to simultaneously engage the clutch pack and operate the plurality of valves.

The plurality of clutch conduits allows for a compact construction of the wet clutch. Additionally, the fact that the actuator engages the clutch pack and operates the plurality of valves means that it controls both the operation, or engagement and disengagement, and the cooling of the clutch pack. This joint function also allows for a more compact construction.

Here, a collar is understood to be ring-shaped, and the collar being mounted on the shaft and the actuator being supported by the collar allows for a more compact construction, for example in comparison with a wet clutch having the actuator supported by an enclosing housing or casing. The proposed technology also allows for a supply of coolant where it has the greatest effect, which is at the inside of the clutch packs.

The clutch pack is understood to be a multiple-plate clutch pack having a plurality of stacked inner and outer plates, or a plurality of stacked driving and driven plates.

The actuator may be a single actuator. This means that there is only one actuator operating the clutch pack and the plurality of valves. The fact that a single actuator can provide this function further contributes to a more compact construction.

The clutch hub may be configured to be rigidly attached directly to the shaft, for example by way of splines. The collar may be rigidly attached to the clutch hub, for example by way of bolts. Alternatively, it may be rigidly attached directly to the shaft. This way, the clutch hub and the collar may be rotationally and axially, or lengthwise, fixed relative to the shaft. When the wet clutch is installed, the fact that the clutch hub and the collar are rotationally and axially fixed relative to the shaft means that they cannot rotate relative to the shaft and cannot shift lengthwise relative to the shaft. That the clutch basket is rotationally supported with respect to the shaft means that it can rotate relative to the shaft, provided that it is not prevented from rotating by the clutch pack. The clutch basket may be axially fixed relative to the shaft, for example by way of a rolling bearing. This means that when the wet clutch is mounted on the shaft, it cannot shift axially with respect to the shaft, and only the clutch basket and the parts of the clutch pack engaging the clutch basket can rotate relative to the shaft.

The clutch hub may be concentric with respect to the shaft. Similarly, the clutch basket may be concentric with respect to the shaft. When the wet clutch is mounted on the shaft, it is understood that the shaft extends through the complete clutch basket and the complete clutch hub. In other words, the wet clutch is configured to allow for the shaft to pass through, or extend along, its complete axial length. This means that the wet clutch forms a through-going hole for receiving the shaft.

The clutch hub may constitute a unitary body manufactured from a single piece of material. Similarly, the collar may constitute a unitary body manufactured from a single piece of material. The clutch hub may form a through hole for receiving the shaft. Similarly, the collar may form a through hole for receiving the shaft.

The coolant may be a liquid. It may further be a lubricant, or have the function of a lubricant in the wet-clutch or in external equipment, such as gears of a gearbox. The coolant may be oil-based.

The wet clutch may be a pull type clutch. The actuator may be configured to engage the clutch pack when activated. This means that the wet clutch must be actively engaged or locked. When the actuator is deactivated, the clutch pack, and by extension the wet clutch, is disengaged or open.

The plurality of individual clutch conduits may comprise ten or more clutch conduits. The hub portion of each clutch conduit may be elongated and aligned with the shaft, or extend parallel with the shaft. Each hub portion may have a cylindrical portion, which means that the portion is shaped like a cylinder. It may have a circular cross-section. The cylindrical portion may have an axis that is parallel to the shaft, or to the axis of the shaft. The cylindrical portions of all hub portions may have parallel cylinder axes. The features specified here enable a compact conduit arrangement, which in turn allows for a more compact wet clutch.

The collar may form a through hole for receiving the shaft. The through hole has a circumferential inner wall portion facing the shaft, the collar forms a circumferential groove, or channel, in the inner wall portion for receiving the coolant from the shaft conduit, and the inlet of the collar portion of each clutch conduit connects to the groove. For example, the shaft conduit may have a single outlet, and when the wet clutch is installed, the circumferential groove may be located at and in fluid communication with the single outlet. The inner wall portion facing the shaft may be configured to be flush with the shaft and thus prevent coolant from leaking between the collar and the shaft.

The collar portions of the clutch conduits may be evenly distributed around the shaft. Similarly, the hub portions of the clutch conduits may be evenly distributed around the shaft. The distribution around the shaft is understood to be an angular distribution with respect to the rotational axis of the shaft. For example, if there are 12 collar portions, there is a 30-degree separation with respect to the rotational axis of the shaft between the centers of neighboring collar portions.

The plurality of clutch conduits and the groove may form part of, or constitute, a conduit arrangement configured to operationally connect the shaft conduit to the outlets and to allow a flow of coolant there between. The conduit arrangement then constitutes a manifold distributing the coolant.

Each clutch conduit, or hub portion, may have a plurality of outlets that are distributed axially with respect to the clutch hub. In extension, this means that outlets are distributed axially with respect to the shaft. Alternatively, each clutch conduit, or hub portion, may have a single outlet that is elongated and extends axially with respect to the clutch hub. This allows for an axial distribution of the coolant, which in turn allows for clutch packs with a greater number of plates and a reduced diameter, thus contributing to a more efficient and compact wet clutch.

The clutch hub and the clutch pack may form, or be connected by, a spline joint, wherein the spline joint comprises a plurality of axially extending ridges and grooves in the clutch hub. The one or more outlets of each clutch conduit may then be located at the bottom of a single groove. In other words, the spline joint may comprise a plurality of male splines in the clutch hub, and the one or more outlets of each clutch conduit may be located between two neighboring male splines. The number of ridges or male splines may be an integer multiple of the number of number of clutch conduits. For example, the number of clutch conduits may be fifteen and the number of male splines may be forty-five, corresponding to an integer multiple of three. The plurality of axially extending ridges and grooves may form a male spline cooperating with a female spline formed by the clutch pack.

The clutch pack may, at a given torque transferred by the shaft, have: (a) an unengaged state in which the clutch hub and the clutch basket are unlocked and can spin at different speeds, (b) a slipping state in which the clutch hub and the clutch basket are partially locked together, or partially engaged by kinetic friction, and can spin at different speeds, and (c) an engaged state in which the clutch hub and the clutch basket are locked together, or fully engaged by static friction, and spin at the same speed. When the clutch hub and the clutch basket are unlocked, it is understood that no torque is mechanically transferred therebetween. A torque transfer caused only by a fluid coupling of the coolant is not considered a mechanical torque transfer in this context. That the clutch hub and the clutch basket are partially locked together means that there is a slipping mechanical coupling between the clutch hub and the clutch basket. The slipping state is understood to encompass a partly engaged state. The clutch hub and the clutch basket being locked together means that there is a non-slipping mechanical coupling between the clutch hub and the clutch basket.

The clutch pack may be concentric with respect to the clutch hub, and in extension with respect to the shaft. The clutch basket may be concentric with respect to the clutch pack, and in extension with respect to the clutch hub. The clutch pack may have an annular shape and extend both radially and axially with respect to the clutch hub, and in extension with respect to the shaft.

The clutch pack may comprise a plurality of inner plates attached, or connected, to the clutch hub and a plurality of outer plates attached, or connected, to the clutch basket. The inner plates can move axially relative to the clutch hub and are rotationally, or angularly, fixed relative to the clutch hub, and the outer plates can move axially relative to the clutch basket and are rotationally, or angularly, fixed relative to the clutch basket. This means that the clutch hub constitutes an inner plate carrier, and the clutch basket constitutes an outer plate carrier.

The inner and outer plates may be positioned alternately in the clutch pack. In the unengaged state there is no mechanical friction between the inner plates and the outer plates; in the slipping state there is a kinetic friction between the inner plates and the outer plates; and in the engaged state there is a static friction between the inner plates and the outer plates.

The actuator may be configured to compress the clutch pack axially. The clutch pack may change from the unengaged state to the engaged state, via the slipping state, when it is compressed axially.

The clutch pack may form a plurality of radially extending channels for the coolant between the inner and outer plates, or through the clutch pack, when the clutch pack is in its engaged state. The channels may be formed in the inner plates and define a square or rectangular grid pattern. The radially extending channels contribute to an efficient cooling of the clutch pack.

The clutch hub may have a plurality of male splines, and each of the plurality of inner plates may have a plurality of female splines cooperating with the plurality of male splines of the clutch hub. The clutch basket may have a plurality of female splines, and each of the plurality of outer plates may have a plurality of male splines cooperating with the plurality of female splines of the clutch basket.

The valve may: (i) prevent, or limit, the flow of coolant when the clutch pack is in its unengaged state; (ii) allow the flow of coolant when the clutch pack is in its slipping state; and (iii) allow the flow of coolant when the clutch pack is in its engaged state. The flow of coolant may be greater when the clutch pack is in its engaged state than when it is in its slipping state. For example, the flow in the slipping state may be in the range 70% to 100% or 90% to 100% of the flow in the engaged state.

The wet clutch may further comprise an annular pressure plate concentric with respect to the shaft and positioned between the actuator and the clutch pack, and the pressure plate may be configured to engage the clutch pack and form part of each valve.

For each valve, the collar may form a valve seat at the coupling, or connection, between the hub portion and the collar portion of the clutch conduit to which the valve is connected. The seat may be a hard seat that is integral with the collar. This means that there is no elastomer gasket providing the sealing. The pressure plate may be disk-shaped and/or have rotational symmetry with respect to the shaft. It may have a central hole, and the pressure plate may have, or form, a plurality of protrusions, or lugs, each extending radially inwards in the central hole, or with respect to the central hole. Each protrusion of the pressure plate may constitute a valve member, or valve disc, of a single valve of the plurality of valves. The protrusions may contact, or seal against, the valve seat of the valve when the wet clutch is in its unengaged state. In its engaged state, the wet clutch may present a gap between the protrusions and the valve seat, thus allowing a flow of the lubricant past the protrusions and into the hub portions.

The pressure plate may form part of or be integral with the actuator. In the slipping state and in the engaged state, the clutch pack may be axially loaded by the pressure plate.

The wet clutch may further comprise a plurality of springs individually positioned in the hub portions of the plurality clutch conduit, wherein each spring engages, or biases, the pressure plate. This means that there is a spring in the hub portion of each clutch conduit. It is understood that the spring biases, or pushes, the pressure plate towards the actuator, or collar.

If the hub portions have cylindrical portions, the springs may be positioned in the cylindrical portions of the hub portions. Each spring may engage the protrusions of the pressure plate. Provided that the protrusions form parts of the valves, this means that the springs jointly act to close the valves. Each spring may be a compression coil spring and oriented to compress and extend parallel to the shaft.

The pressure plate, or the protrusions, may block the collar portions of the clutch conduits, when the clutch pack, or wet clutch, is in its unengaged state. This way, the coolant is prevented from flowing through the clutch conduits and reaching the clutch pack.

The actuator may comprise an annular recess formed by the collar and concentric with the shaft, and a ring-shaped piston positioned in the recess and configured to move axially relative to the shaft.

The annular recess may face, or be open in the direction of, the clutch pack or the pressure plate. The ring-shaped piston may engage or contact the annular pressure plate. In the slipping state and in the engaged state, the ring-shaped piston axially loads, or presses against, the pressure plate. The plurality of springs may bias, or push, the pressure plate towards, or against, the ring-shaped piston.

The shaft may have an additional internal shaft conduit for a hydraulic fluid, and the actuator may be configured to operationally connect to the additional internal shaft conduit. More precisely, the annular recess may be configured to connect to, or provide a fluid communication with, the additional internal shaft, for example by way of a connecting conduit. When installed, this means that the actuator is activated by increasing the pressure of the hydraulic fluid, which causes the ring-shaped piston to move towards the clutch pack, or the pressure plate, and engage the wet clutch.

The wet clutch may further comprise: a radially extending flange, or back end, configured to be mounted on the shaft, wherein the flange is juxtaposed to the clutch hub, and the clutch pack is positioned between the flange and the collar, wherein the clutch pack is pressed against the flange when the clutch pack is engaged by the actuator.

The flange may be rigidly attached to the clutch hub, for example by way of bolts. Alternatively, it may be rigidly attached directly to the shaft. Either way, the clutch hub and the collar may be rotationally and axially fixed relative to the shaft. It is understood that the flange extends outwards with respect to, or transverse to, the shaft. The flange has the function of an abutment, or end plate, against which the clutch pack is pressed by the actuator. In the slipping state and in the engaged state, the clutch pack is then axially loaded by the pressure plate and the flange. The flange may be concentric with respect to the shaft. It may have an annular shape. The flange allows for a compact construction of the wet clutch.

The clutch basket may have a cylindrical shape, or it may be ring-shaped. This means that the clutch basket has a limited radial extent and that it does not form an end plate extending in the radial direction. The clutch basket comprises, or forms, a plurality of apertures for allowing the coolant to escape the wet clutch in the radial direction. This means that the wet clutch is not sealed, and that the coolant is not contained in the wet clutch. Thus, no circulation system for the coolant is required within the wet clutch as such, which allows for a more compact construction. Instead, the coolant may be circulated by an external system. Additionally, this allows for the wet clutch to be free from coolant when the wet clutch, or clutch pack, is not engaged. Additionally or alternatively, there may be a gap between the clutch basket and the collar through which the coolant can escape the wet clutch.

The above objects are also achieved by a second aspect of the proposed technology, in which a gear assembly is provided for mounting on a shaft having an internal shaft conduit for a coolant. The gear assembly comprises: a gear wheel or cog wheel, configured to be rotationally supported relative to the shaft, and a wet clutch according to the first aspect of the proposed technology. The wet clutch is configured to be mounted on the shaft and operationally connected to the internal shaft conduit, and the clutch basket of the wet clutch is attached to, or mounted on, the gear wheel. The shaft may have an additional internal shaft conduit for a hydraulic fluid, and the actuator may be configured to operationally connect to the additional internal shaft conduit.

The term "operationally connected to the internal shaft conduit" is here understood to encompass the inlet of the collar portion of each individual clutch conduit of the wet clutch being coupled to, or in fluid communication with, the internal shaft conduit. It is understood that the clutch basket is rotationally fixed relative to the gear wheel.

The gear wheel and the wet clutch may be concentric with respect to the shaft. It is understood that the term "gear wheel" does not encompass sprockets, or sprocket-wheels, commonly used for meshing with chains, belts, or the like. The gear wheel may have a maximum radius that is two to seven times greater than the width at maximum radius. The maximum radius is understood as the radius of the outer circle defined by the apexes of the cogs or teeth of the cog wheel, and the width may be the width at the cogs or teeth.

The gear wheel may have, or form, an axially extending flange concentric with the shaft, wherein the clutch basket and the flange overlap. The clutch basket is attached to the flange. The clutch basket and the flange may have conforming shapes at the overlap. The outer side of the flange may conform to the inner side of the clutch basket at the overlap.

The gear assembly as a whole may form a through hole for receiving the shaft.

The gear assembly may further comprise: a radial spacer configured to be rotationally fixed relative to the shaft, and a radial rolling bearing having an inner race attached to the radial spacer and an outer race attached to the gear wheel. The radial spacer has the effect of a greater radius of the rolling bearing, which allows for greater radial loads on the gear assembly. Additionally, it reduces the mass that rotates relative to the shaft, which allows for a faster response when engaging the wet clutch.

It is understood that the gear wheel has a central through bore, or hole, with a cylindrical inner wall, and that the outer race may conform to, or be attached to, the inner wall of the through bore. The radial spacer may have a ring-shaped hollow body. The body may be hollow or partly-hollowed. The radial spacer may be attached to, or mounted on, the clutch hub. The clutch hub in turn may be configured to be mounted on and rigidly attached directly to the shaft, as explained above. This way, the radial spacer is configured to be rotationally fixed relative to the shaft.

The above objects are also achieved by a third aspect of the proposed technology, in which a shaft assembly is provided comprising: a shaft having an internal shaft conduit for a coolant, and a gear assembly according to the second aspect of the proposed technology, wherein the gear assembly is mounted on the shaft and operationally connected to the internal shaft conduit.

The term "operationally connected to the internal shaft conduit" is here understood to encompass the wet clutch of the gear assembly being operationally connected to the internal shaft conduit. The shaft may have an additional internal shaft conduit for a hydraulic fluid, and the gear assembly, or the actuator of the wet clutch, may be configured to operationally connect to the additional internal shaft conduit.

BRIEF DESCRIPTION OF THE DRAWINGS

A more complete understanding of the abovementioned and other features and advantages of the proposed technology will be apparent from the following detailed description of preferred embodiments of the proposed technology in conjunction with the appended drawings, wherein.

DETAILED DESCRIPTION

Figure 1:
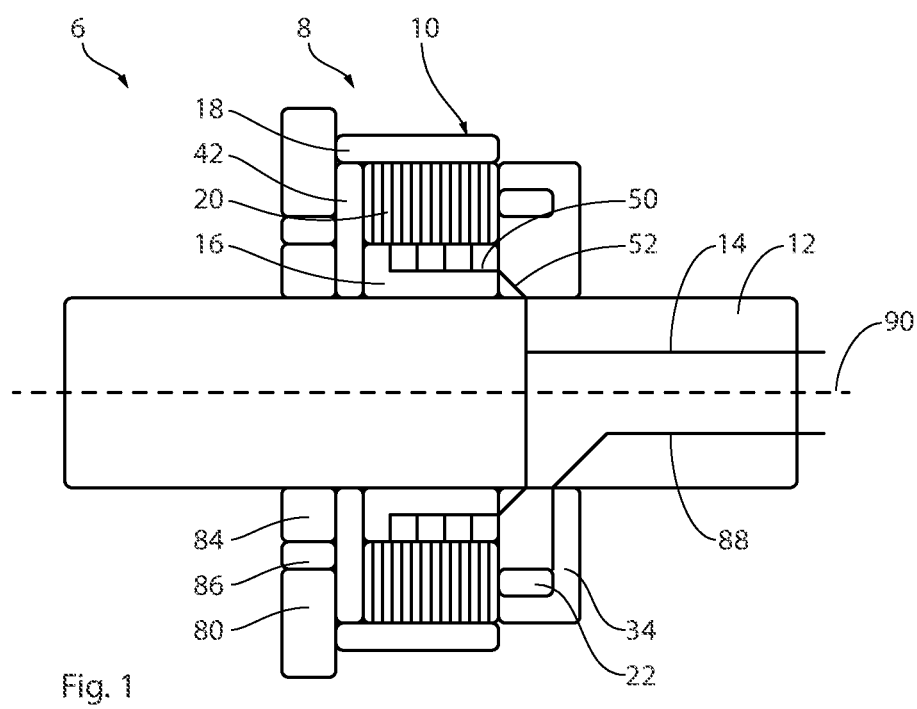
FIG. 1 schematically illustrates an embodiment of shaft assembly.

FIG. 1 schematically illustrates a shaft assembly 6 that has a shaft 12 with an internal shaft conduit 14 intended for carrying a combined coolant and lubricant. It also has a gear assembly 8 that is mounted on the shaft 12 and connected to the internal shaft conduit 14. The gear assembly 8 as a whole forms a through hole 68 receiving the shaft 12, whereby the shaft 12 passes through the complete gear assembly 8.

Figure 2:
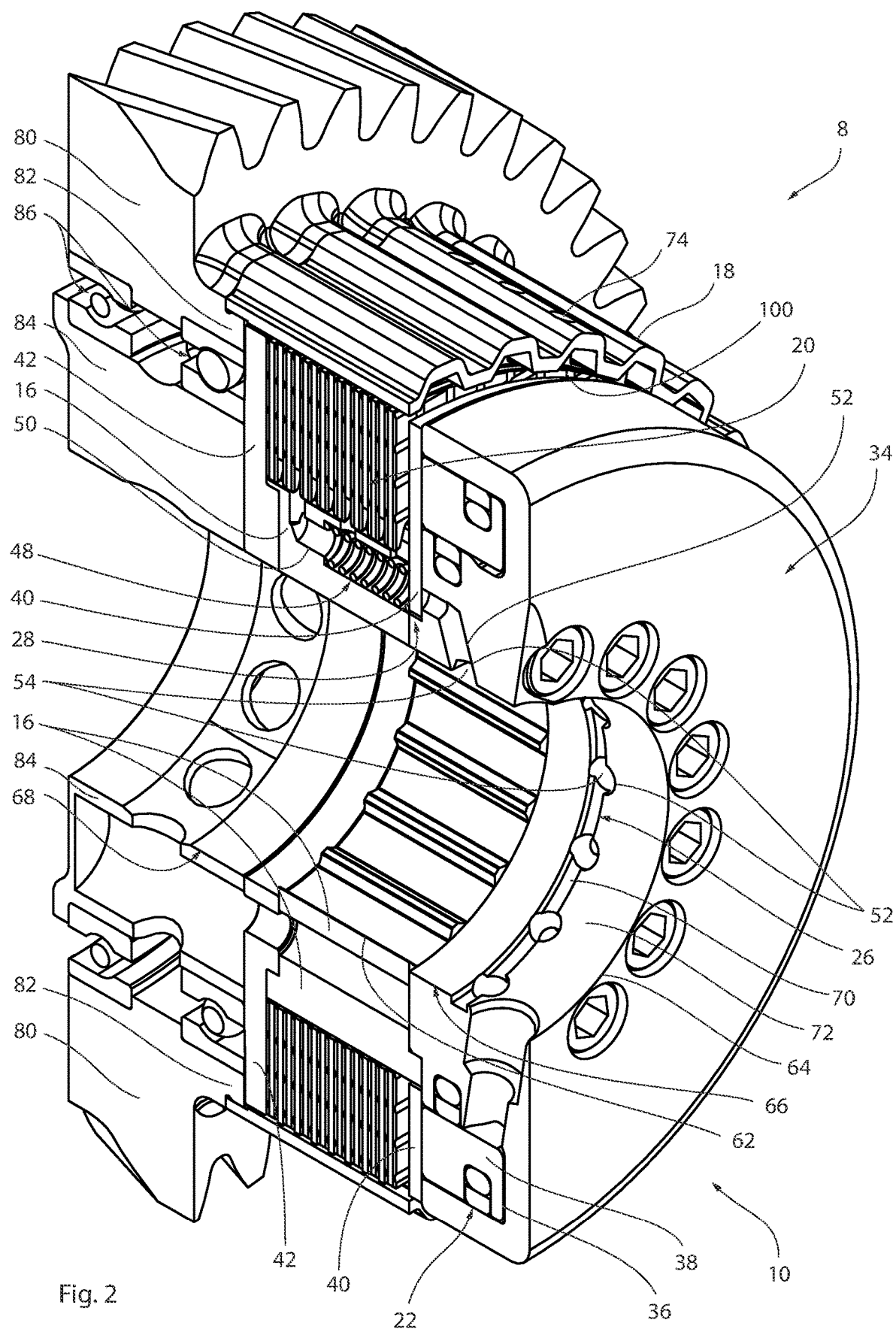
FIG. 2 illustrates a perspective cross-section of the gear assembly shown in FIG. 1.

The gear assembly 8 has a gear wheel 80 that is rotationally supported with respect to shaft 12, as can be seen in FIG. 2. It also has a wet clutch 10 that is mounted on the shaft 12 and operationally connected to the internal shaft conduit 14. The wet clutch 10 comprises a clutch hub configured to be mounted on the shaft 12 and a clutch basket 18 configured to be rotationally supported relative to the shaft 12.

The gear wheel 80 and the wet clutch 10 are concentric with respect to the shaft 12. The gear wheel 80 has an axially extending flange 82 that is also concentric with the shaft 12. The clutch basket 18 and the flange 82 overlap at the flange 82. The outer side of the flange 82 conforms to the inner side of the clutch basket 18 at the overlap, whereby the clutch basket 18 is attached to the flange 82, and in extension to the gear wheel 80.

The wet clutch 10 is a multi-plate clutch, and the shaft 12 passes through the complete wet clutch 10. The wet clutch 10 has a clutch hub 16 that is mounted on the shaft 23 and is radially fixed relative to the shaft 12 by way of splines. As mentioned above, the clutch basket 18 of the wet clutch 10 is rotationally supported relative to shaft 12, and the wet clutch 10 further includes a clutch pack 20 that connects the clutch hub 16 and the clutch basket 18. The wet clutch 10 also has a collar 34 that is juxtaposed and attached to the clutch hub 16, for example by bolts or an equivalent. This way, the collar 34 is mounted on and rotationally fixed relative to the shaft 12.

The clutch hub 16 and the clutch basket 18 are concentric with respect to the shaft 12. The clutch hub 16 forms a through hole 62, and the collar 34 forms another through hole 64. This means that the clutch hub 10 as a whole forms a through hole 66 that receives the shaft 12.

The gear assembly 8 has a radial spacer 84 that is rotationally fixed relative to the clutch hub 16 by way of bolts or an equivalent. Thus, it is also rotationally fixed relative to the shaft 12. The gear assembly 8 further has a radial rolling bearing 86 with an inner race attached to the radial spacer 84 and an outer race attached to the gear wheel 80. The gear wheel 80 has a central through bore with a cylindrical inner wall, and the outer race conforms to and engages the inner wall of the through bore. The radial spacer 84 has a ring-shaped, partly-hollowed body.

Clamps or the like (not shown) are positioned on the shaft 12 on either side of the gear assembly 8, thus axially fixing the wet clutch 10, and in extension, the clutch hub 16, the clutch basket 18, and the collar 34, relative to the shaft 12.

The clutch hub 16 may be manufactured from a single piece of material. Similarly, the collar 34 may be manufactured from a single piece of material. This means that both components may individually constitute a unitary body.

The wet clutch 10 has a number of individual clutch conduits 48, such as, for example, 15 clutch conduits 48. Each has a collar portion 52 formed by the collar 34 and a hub portion 50 formed by the clutch hub 16. The collar portion 52 has an inlet 54 that can receive the coolant. The hub portion 50 is coupled to the collar portion 52 and has several (e.g., three) outlets at the clutch pack 20 through which the coolant can be released. The outlets 24 are distributed axially with respect to the clutch hub 16, which means that they are distributed lengthwise with respect to the shaft 12.

Figure 3:
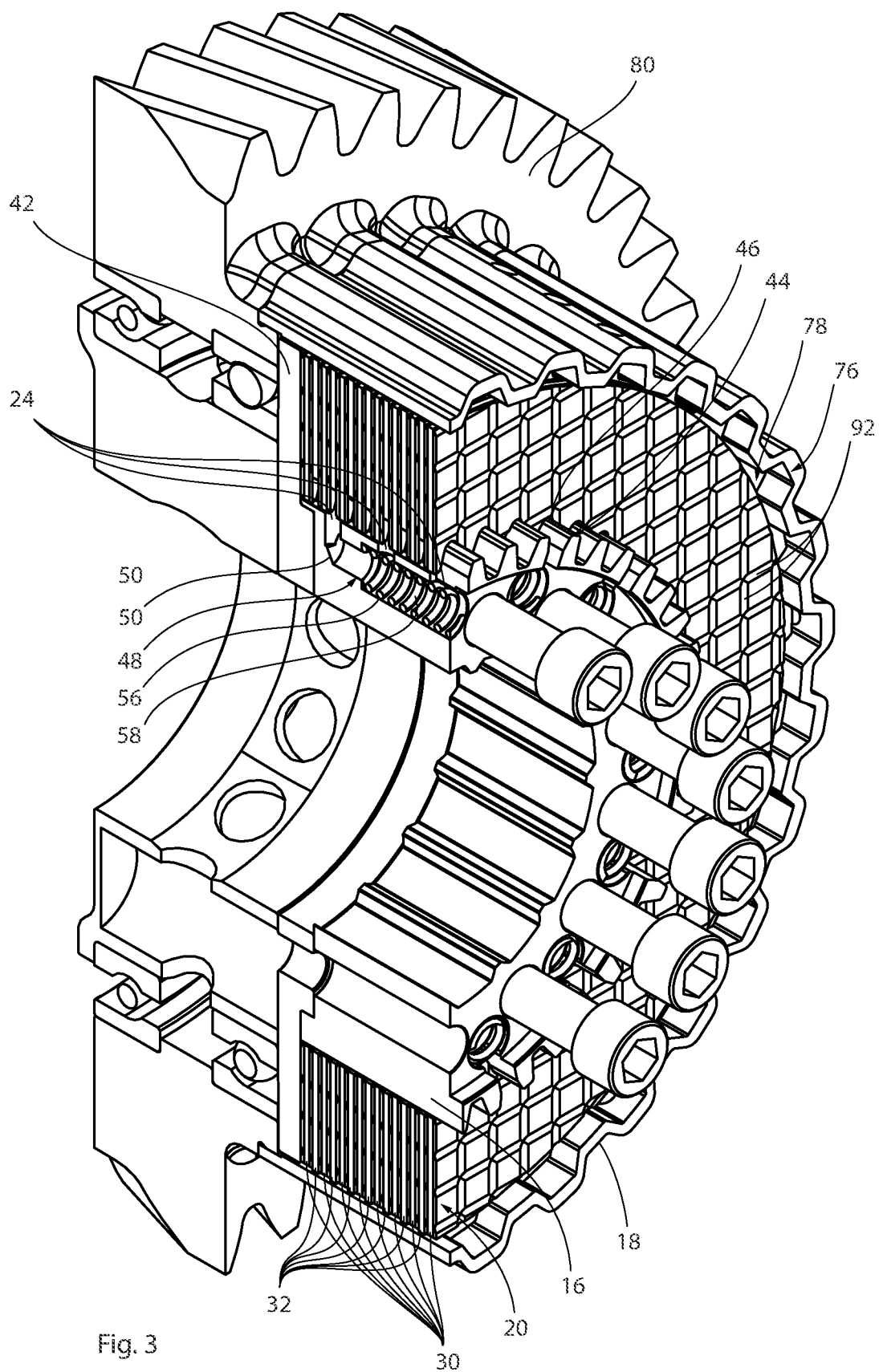
FIG. 3 illustrates a perspective cross-section of a part of the gear assembly shown in FIG. 2.

The hub portion 50 of each clutch conduit 48 is elongated and aligned with the shaft 12. Each hub portion 50 has a cylindrical portion 56 with a circular cross-section and an axis that is parallel to the axis 90 of the shaft 12, as can be seen in FIG. 3. This means that all cylindrical portions 56 have parallel cylinder axes.

The through hole 64 of the collar 34 that receives the shaft 12 has a circumferential inner wall portion 72 facing the shaft 12. The collar 34 forms a circumferential groove 70 in the inner wall portion 72 that can receive the coolant from the shaft conduit 14, and the inlet 54 of the collar portion 52 of each clutch conduit 48 connects to the groove 70. The inner wall portion 72 facing the shaft 12 is flush with the outer surface of the shaft 12. This way, the individual clutch conduits 48 form part of a conduit arrangement 26 that connects the shaft conduit 14 to the outlets 24. The conduit arrangement 26 allows a flow of coolant from the shaft conduit 14 to be distributed at the clutch pack 20, thus having the function of a manifold.

The collar portions 52 and the hub portions 50 of the clutch conduits 48 are evenly distributed around the shaft 12. They have a 24-degree separation with respect to the rotational axis 90 of the shaft 12 between neighboring clutch conduits 48.

The clutch hub 16 has a number of axially extending ridges 44 that form part of a spline joint with the clutch pack 20. The outlets 24 of each clutch conduit 48 are located between a pair of neighboring ridges 44, such as at the bottom of a single groove between neighboring ridges 44. Advantageously, there may be about three times as many ridges 44 than clutch conduits 45, such as, for example, forty-five ridges 44 and fifteen clutch conduits 48. The axially extending ridges 44 form male splines 44 cooperating with female splines 46 formed by the clutch pack 20.

The clutch pack 20 has three states. In the first state, or the unengaged state, the clutch hub 16 and the clutch basket 18 are unlocked and can spin at different speeds. In extension, this means that the gear wheel 80 can spin freely relative to the shaft 12. In the second state, or the slipping state, the clutch hub 16 and the clutch basket 18 are partly locked together but can spin at different speeds. This means that some torque is transferred from the shaft 12 to the gear wheel 80. In the third state, or the engaged state, the clutch hub 16 and the clutch basket 18 are locked together and spin at the same speed. This means that all torque supplied to the shaft 12 is transferred to the gear wheel 80.

The wet clutch 10 has a number of valves 28, such as, for example, fifteen valves 28. Each valve 28 controls the flow of coolant through a single clutch conduit 48. The wet clutch 10 further has an actuator 22 supported by the collar 34 and an annular pressure plate 40 that is concentric with respect to the shaft 12. The pressure plate 40 is positioned between the actuator 22 and the clutch pack 20 such that it can engage the clutch pack 20 when the actuator 22 is activated. Additionally, the pressure plate 40 forms part of each valve 28, which means that it simultaneously engages the clutch pack 20 and operates the valves 28.

When activated, the actuator 22 compresses the clutch pack 20 axially, and the clutch pack 20 changes from the unengaged state to the engaged state, via the slipping state, when it is compressed axially.

The clutch pack 20 is concentric with respect to the clutch hub 16 and the shaft 12. The clutch basket 18 is concentric with respect to the clutch pack 20, and in extension with respect to the clutch hub 16. The clutch pack 20 has an annular shape and extends both radially and axially with respect to the axis of the shaft 90.

The clutch pack 20 has a plurality (e.g., eight) of inner plates 30 attached to the clutch hub 16, which constitutes an inner plate carrier, and a plurality (e.g., seven) of interleaved outer plates 32 attached to the clutch basket 18, which constitutes an outer plate carrier. The inner plates 30 can move axially relative to the clutch hub 16 and are rotationally fixed relative to the clutch hub 16. Similarly, the outer plates 32 can move axially relative to the clutch basket 18 and are rotationally fixed relative to the clutch basket 18.

The inner and outer plates 30 and 32 are positioned alternately in the clutch pack 20. In the unengaged state there is no mechanical friction between the inner plates and the outer plates; in the slipping state there is a kinetic friction between the inner plates 30 and the outer plates 32; and in the engaged state there is a static friction between the inner plates 30 and the outer plates 32.

The clutch pack 20 forms channels 92 in a square grid pattern on both sides of each inner plate 30. Even though not radially oriented, the square grid on the circular plate 30 mean that all the channels 92 to some extent extend radially with respect to the shaft 12, which enables the coolant to flow radially outwards through the clutch pack 20.

As mentioned above, the clutch hub 16 has a number of outer male splines 44 and each inner plate 30 has the same number female splines 46 that cooperated with the male splines 44. Similarly, the clutch basket 18 has female splines 76, and each of the outer plates 32 has male splines 78 cooperating with the female splines 76.

The valves 28 have been constructed to prevent the flow of coolant through the clutch conduits 48 when the clutch pack 20 is in its unengaged state. It further allows the flow of coolant when the clutch pack 20 is in its slipping state and its engaged state. In some embodiments, the flow of coolant is up to ten times greater when the clutch pack 20 is in its engaged state than in its unengaged state. This means that there is a flow of coolant even if the valves 28 are in the closed state.

The collar 34 forms a valve seat 96 at each coupling between the hub portions 50 and the collar portions 52 of the clutch conduits 48. The valve seat 96 may be a hard seat integral to the collar 34.

Figure 4:
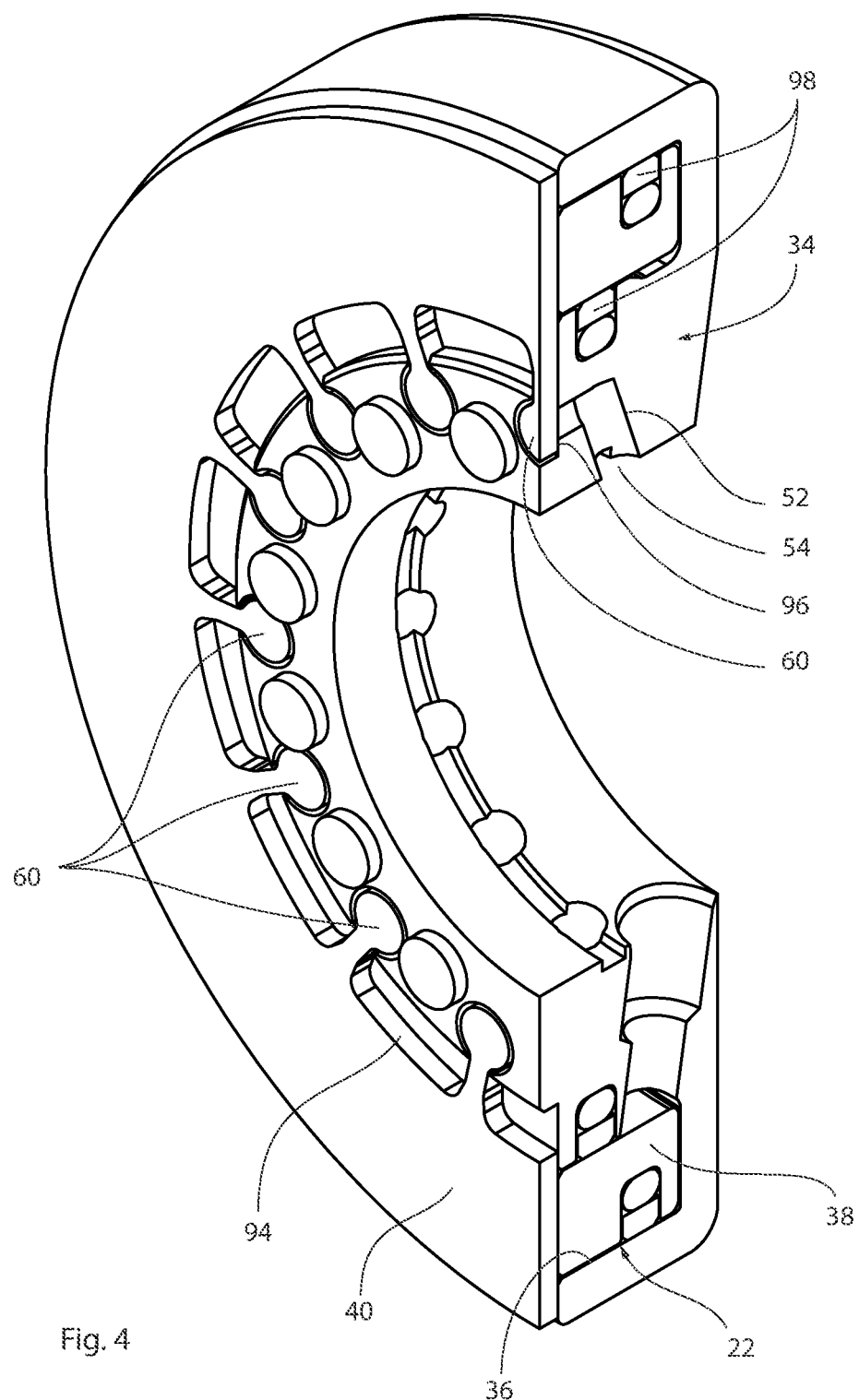
FIG. 4 illustrates a perspective cross-section of another part of the gear assembly shown in FIG. 2.

The pressure plate 40 is disc-shaped and planar, and it has a rotational symmetry with respect to the axis 90 of the shaft 12. It has a central through hole 94 and forms a number (e.g., fifteen) of protrusions 60, each extending radially inwards in the central hole 94, as illustrated in FIG. 4. Each protrusion 60 constitutes a valve member, or valve disc, of a single valve 28 and seals against one of the valve seats 96 when the wet clutch 10 is in its unengaged state. In the engaged state of the wet clutch 10, the pressure plate 40 is pushed by the actuator 22 such that a gap is formed between the protrusions 60 and the valve seats 96, thus allowing a flow of the coolant past the protrusions 60 and into the hub portions 50, from where it is expelled via the outlets 24.

A compression coil spring 58 is positioned in the cylindrical portion 56 of each hub portion 50. Each spring 58 engages a single protrusion 60 of the pressure plate 40, and the springs 58 jointly bias the pressure plate 40 with respect to the clutch hub 16 and push the pressure plate towards the actuator 22, thus acting to close the valves 28.

A valve is closed when the clutch pack 20, or the wet clutch 10, is in its unengaged state, at which the protrusions 60 block the collar portions 52 of the clutch conduits 48. This way, the coolant is prevented from flowing through the clutch conduits 48 and reaching the clutch pack 20.

The actuator 22 has an annular recess 36 formed by the collar 34 and concentric with the axis 90 of the shaft 12. It further has a ring-shaped piston 38 positioned in the recess 36 and configured to move axially relative to the shaft 12.

The piston 38 is sealed by gaskets 98, preventing leakage of a hydraulic fluid past the piston 38.

The ring-shaped piston 38 engages the annular pressure plate 40. In the slipping state and in the engaged state, the piston 38 presses against and axially loads the pressure plate 40. The plurality of springs 58 provides a counter force pushing the pressure plate 40 against the ring-shaped piston 38. By way of the pressure plate 40, the actuator 22 is configured to simultaneously engage the clutch pack 20 and operate the plurality of valves 28.

The shaft 12 has an additional internal shaft conduit 88 for a hydraulic fluid, and the annular recess 36 is connected to the additional internal shaft conduit 88. The actuator 22 is activated by increasing the pressure of the hydraulic fluid, which causes the ring-shaped piston 38 to move towards the clutch pack 20 and engage the wet clutch 10.

The wet clutch 10 further has a radially and outwardly extending flange 42 mounted on and concentric with the shaft 12. The flange 42 is juxtaposed to the clutch hub 16, and the clutch pack 20 is positioned between the flange 42 and the collar 34. The flange 42 is attached to the clutch hub 16 by way of bolts or the like. The clutch pack 20 is pressed against the flange 42 when the clutch pack 20 is engaged by the actuator 22 in the slipping state and in the engaged state of the wet clutch 10.

The clutch basket 18 has a cylindrical shape without endplates, as can be seen in FIG. 3. It has several apertures 74 through which the coolant can escape the wet clutch 10 radially with respect to the axis 90 of the shaft 12. There is also a gap between the clutch basket 18 and the collar 34 through which the coolant can escape the wet clutch 10.

ITEM LIST

6 shaft assembly
8 gear assembly
10 wet clutch
12 shaft
14 internal shaft conduit for coolant
16 clutch hub
18 clutch basket
20 clutch pack
22 actuator
24 outlets
26 conduit arrangement
28 valve
30 inner plates
32 outer plates
34 collar
36 ring-shaped groove
38 ring-shaped piston
40 pressure plate
42 flange
44 male spline of clutch hub
46 female spline of inner plates
48 clutch conduit
50 hub portion of individual clutch conduits
52 collar portion of individual clutch conduits
54 inlet of clutch conduit
56 cylindrical portion
58 spring
60 protrusions of pressure plate
62 through hole of clutch hub
64 through hole of collar
66 through hole of wet clutch
68 through hole of gear assembly
70 circumferential groove of collar
72 inner wall portion of through hole of collar
74 apertures of clutch basket
76 female splines of clutch basket
78 male splines of outer plates
80 gear wheel
82 axially extending flange of gear wheel
84 radial spacer
86 rolling bearing
88 additional internal shaft conduit for hydraulic fluid
90 axis of shaft
92 channels of inner plates
94 through hole of pressure plate
96 valve seat
98 gaskets
100 gap

What is claimed is:

1. A multiple-plate wet clutch for mounting on a shaft having an internal shaft conduit for a coolant, wherein the shaft passes through the multiple-plate wet clutch, the multiple-plate wet clutch comprising:
   a clutch hub configured to be mounted on the shaft;
   a clutch basket configured to be rotationally supported relative to the shaft;
   a clutch pack operationally connecting the clutch hub and the clutch basket;
   a collar configured to be mounted on the shaft, wherein the collar is juxtaposed to the clutch hub;
   a plurality of clutch conduits, wherein each clutch conduit has a collar portion formed by the collar and a hub portion formed by the clutch hub, wherein the collar portion has an inlet configured for receiving the coolant, wherein the hub portion of each clutch conduit is coupled to the collar portion and has one or more outlets at the clutch pack configured for releasing the coolant, and wherein the hub portion of each clutch conduit is elongated and aligned with the shaft;
   a plurality of valves, wherein each valve is operationally connected to a single clutch conduit and is configured to control flow of the coolant through the clutch conduit; and
   an actuator supported by the collar and configured to simultaneously engage the clutch pack and operate the plurality of valves.

2. The multiple-plate wet clutch according to claim 1, wherein the collar forms a through hole configured for receiving the shaft, wherein the through hole has a circumferential inner wall portion facing the shaft, wherein the collar forms a circumferential groove in the inner wall portion configured for receiving the coolant from the shaft conduit, and wherein the inlet of the collar portion of each clutch conduit connects to the groove.

3. The multiple-plate wet clutch according to claim 1, wherein each clutch conduit has a plurality of outlets that are distributed axially with respect to the clutch hub.

4. The multiple-plate wet clutch according to claim 1, wherein the clutch hub and the clutch pack form a spline joint, wherein the spline joint comprises a plurality of axially extending ridges and grooves in the clutch hub, wherein the one or more outlets of each clutch conduit are located at the bottom of a single one of the grooves in the clutch hub.

5. The multiple-plate wet clutch according to claim 1, wherein the clutch pack has:
   (a) an unengaged state in which the clutch hub and the clutch basket are unlocked so as to be able to spin at different speeds;

(b) a slipping state in which the clutch hub and the clutch basket are partly locked together so as to be able to spin at different speeds; and (c) an engaged state in which the clutch hub and the clutch basket are locked together so as to spin at the same speed;

wherein the clutch pack comprises a plurality of inner plates attached to the clutch hub and a plurality of outer plates attached to the clutch basket, wherein the actuator is configured to compress the clutch pack axially, wherein the clutch pack changes from the unengaged state to the engaged state via the slipping state when it is compressed axially, and wherein the clutch pack forms radially extending channels for the coolant between the inner plate and the outer plate when the clutch pack is in its engaged state.

6. The multiple-plate wet clutch according to claim 5, wherein the valve is configured to:
(i) prevent the flow of the coolant when the clutch pack is in the unengaged state;
(ii) allow the flow of the coolant when the clutch pack is in the slipping state; and
(iii) allow the flow of the coolant when the clutch pack is in the engaged state.

7. The multiple-plate wet clutch according to claim 1, wherein the multiple-plate wet clutch further comprises an annular pressure plate concentric with respect to the shaft and positioned between the actuator and the clutch pack, wherein the pressure plate is configured to engage the clutch pack and forms part of each valve.

8. The multiple-plate wet clutch according to claim 7, further comprising a plurality of springs, each of which is individually positioned in the hub portions of the plurality clutch conduits, wherein each spring biases the pressure plate.

9. The multiple-plate wet clutch according to claim 7, wherein the actuator comprises:
an annular recess formed by the collar and concentric with the shaft; and
a ring-shaped piston positioned in the annular recess and configured to move axially relative to the shaft and to engage the pressure plate.

10. The multiple-pate wet clutch according to claim 1, further comprising:
a radially extending flange configured to be mounted on the shaft, wherein the flange is juxtaposed to the clutch hub, and wherein the clutch pack is positioned between the flange and the collar, and wherein the clutch pack is pressed against the flange when the clutch pack is engaged by the actuator.

11. The multiple-plate wet clutch according to claim 1, wherein the clutch basket has a cylindrical shape and comprises a plurality of apertures configured for allowing the coolant to escape the multiple-plate wet clutch in a radial direction.

12. A gear assembly for mounting on a shaft having an internal shaft conduit for a coolant, wherein the shaft passes through the gear assembly, wherein the gear assembly comprises:
a gear wheel configured to be rotationally supported with respect to the shaft; and
a multiple-plate wet clutch mounted on the shaft and operationally connected to the internal shaft conduit, wherein the multiple-plate wet clutch comprises:
a clutch hub configured to be mounted on the shaft;
a clutch basket attached to the gear wheel so as to be rotationally supported relative to the shaft;
a clutch pack operationally connecting the clutch hub and the clutch basket;
a collar configured to be mounted on the shaft, wherein the collar is juxtaposed to the clutch hub;
a plurality of clutch conduits, wherein each clutch conduit has a collar portion formed by the collar and a hub portion formed by the clutch hub, wherein the collar portion has an inlet configured for receiving the coolant, wherein the hub portion of each clutch conduit is coupled to the collar portion and has one or more outlets at the clutch pack configured for releasing the coolant, and wherein the hub portion of each clutch conduit is elongated and aligned with the shaft;
a plurality of valves, wherein each valve is operationally connected to a single clutch conduit and is configured to control flow of the coolant through the clutch conduit; and
an actuator supported by the collar and configured to simultaneously engage the clutch pack and operate the plurality of valves.

13. The gear assembly according to claim 12, wherein the gear assembly further comprises:
a radial spacer configured to be rotationally fixed relative to the shaft; and
a radial rolling bearing having an inner race attached to the radial spacer and an outer race attached to the gear wheel.

14. The gear assembly according to claim 12, wherein the clutch hub and the clutch pack form a spline joint, wherein the spline joint comprises a plurality of axially extending ridges and grooves in the clutch hub, wherein the one or more outlets of each clutch conduit are located at the bottom of one of the grooves in the clutch hub.

15. The gear assembly according to claim 12, wherein the multiple-plate wet clutch further comprises an annular pressure plate concentric with respect to the shaft and positioned between the actuator and the clutch pack, wherein the pressure plate is configured to engage the clutch pack and forms part of each valve.

16. A shaft assembly, comprising:
a shaft having an internal shaft conduit for a coolant; and
a gear assembly mounted on the shaft and operationally connected to the internal shaft conduit, wherein the gear assembly comprises:
a gear wheel configured to be rotationally supported with respect to the shaft; and
a multiple-plate wet clutch mounted on the shaft and operationally connected to the internal shaft conduit, wherein the multiple-plate wet clutch comprises:
a clutch hub configured to be mounted on the shaft;
a clutch basket attached to the gear wheel so as to be rotationally supported relative to the shaft;
a clutch pack operationally connecting the clutch hub and the clutch basket;
a collar configured to be mounted on the shaft, wherein the collar is juxtaposed to the clutch hub;
a plurality of clutch conduits, wherein each clutch conduit has a collar portion formed by the collar and a hub portion formed by the clutch hub, wherein the collar portion has an inlet configured for receiving the coolant, wherein the hub portion of each clutch conduit is coupled to the collar portion and has one or more outlets at the clutch pack configured for releasing the coolant, and wherein the hub portion of each clutch conduit is elongated and aligned with the shaft;

a plurality of valves, wherein each valve is operationally connected to a single clutch conduit and is configured to control flow of the coolant through the clutch conduit; and an actuator supported by the collar and configured to simultaneously engage the clutch pack and operate the plurality of valves.

17. The shaft assembly according to claim 16, wherein the gear assembly further comprises:

a radial spacer rotationally fixed relative to the shaft; and a radial rolling bearing having an inner race attached to the radial spacer and an outer race attached to the gear wheel.

18. The shaft assembly according to claim 16, wherein the clutch hub and the clutch pack form a spline joint, wherein the spline joint comprises a plurality of axially extending ridges and grooves in the clutch hub, wherein the one or more outlets of each clutch conduit are located at the bottom of one of the grooves in the clutch hub.

19. The shaft assembly according to claim 16, wherein the multiple-plate wet clutch further comprises an annular pressure plate concentric with respect to the shaft and positioned between the actuator and the clutch pack, wherein the pressure plate is configured to engage the clutch pack and forms part of each valve.

* * * * *